US008556212B2

(12) United States Patent
Breuer et al.

(10) Patent No.: US 8,556,212 B2
(45) Date of Patent: Oct. 15, 2013

(54) DEVICE FOR DELIMITING A CREW REST COMPARTMENT AND METHOD FOR IMPLEMENTING SUCH A DEVICE

(75) Inventors: Matthias Breuer, Hamburg (DE); Michael Mosler, Plaisance du Touch (FR)

(73) Assignee: Airbus Operations GmbH, Hamburg (DE)

( * ) Notice: Subject to any disclaimer, the term of this patent is extended or adjusted under 35 U.S.C. 154(b) by 389 days.

(21) Appl. No.: 12/882,759

(22) Filed: Sep. 15, 2010

(65) Prior Publication Data
US 2011/0062283 A1  Mar. 17, 2011

Related U.S. Application Data

(60) Provisional application No. 61/242,581, filed on Sep. 15, 2009.

(30) Foreign Application Priority Data

Sep. 15, 2009  (DE) .......................... 10 2009 041 581

(51) Int. Cl.
*B64D 13/00*  (2006.01)
(52) U.S. Cl.
USPC ........................ 244/118.6; 244/118.5; 104/89

(58) Field of Classification Search
USPC ......... 244/118.5, 118.6; 104/89, 91, 140, 146
See application file for complete search history.

(56) References Cited

U.S. PATENT DOCUMENTS

| 2,310,573 | A | * | 2/1943 | Burton ....................... 244/118.6 |
| 2,710,731 | A | * | 6/1955 | Bright et al. ............... 244/118.6 |
| 6,105,653 | A |   | 8/2000 | Armstrong |
| 6,523,779 | B1 | * | 2/2003 | Michel ....................... 244/118.5 |
| 8,123,165 | B2 | * | 2/2012 | Breuer et al. .............. 244/118.5 |
| 2006/0001302 | A1 | * | 1/2006 | Achilles et al. ............ 297/284.1 |

FOREIGN PATENT DOCUMENTS

| DE | 4119623 C1 | 10/1992 |
| WO | 2010/084048 A1 | 7/2010 |

* cited by examiner

*Primary Examiner* — Timothy D Collins
*Assistant Examiner* — Jamie S Stehle
(74) *Attorney, Agent, or Firm* — Barnes & Thornburg LLP

(57) ABSTRACT

A device for delimiting a crew rest area in an aircraft passenger cabin includes a curtain which is adapted to separate at least one seat disposed in the aircraft passenger cabin from a region of the aircraft passenger cabin surrounding the seat. In addition, the device includes a fastening device for fastening the curtain in the aircraft passenger cabin. At least a first part of the fastening device is fixed to a grip rail intended for installation in the aircraft passenger cabin or formed integral with the grip rail intended for installation in the aircraft passenger cabin.

19 Claims, 8 Drawing Sheets

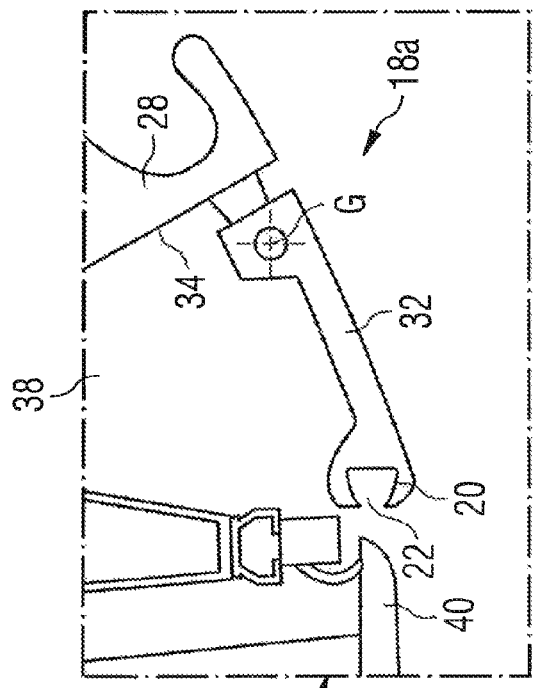
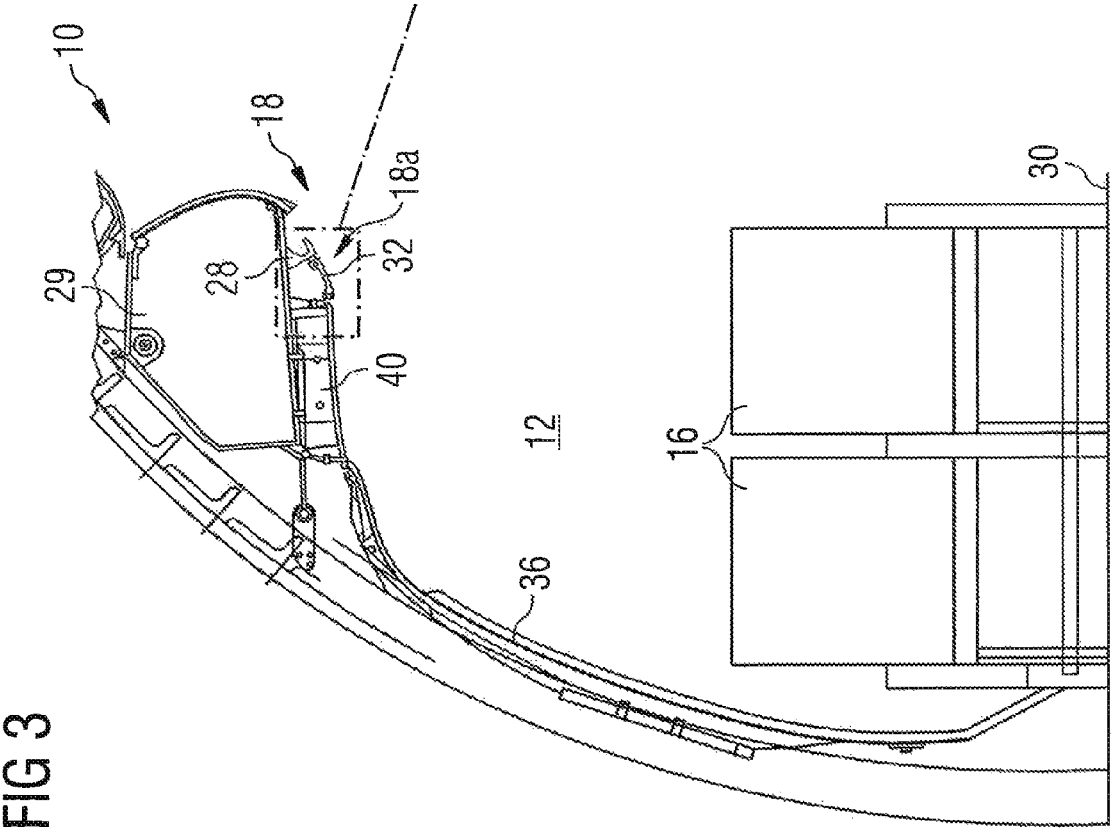
FIG 4
FIG 3

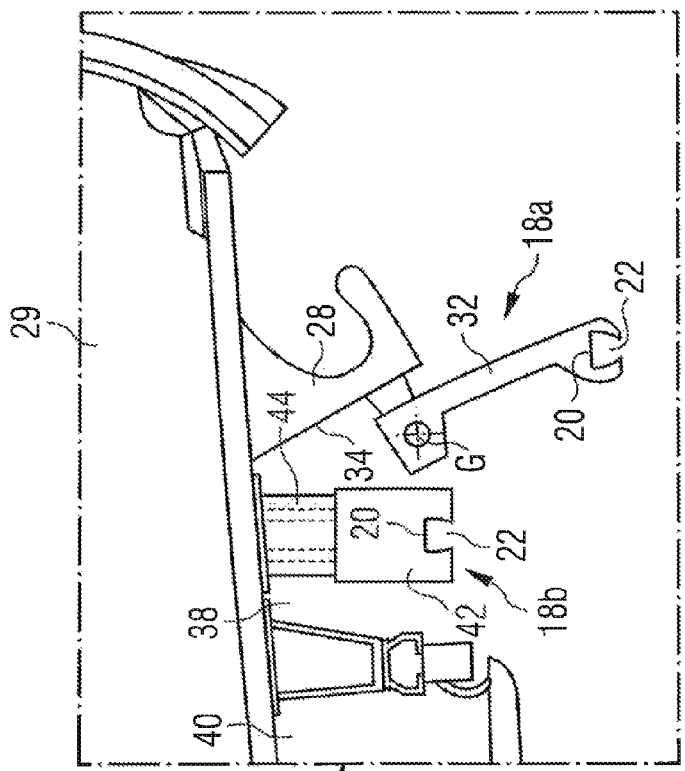
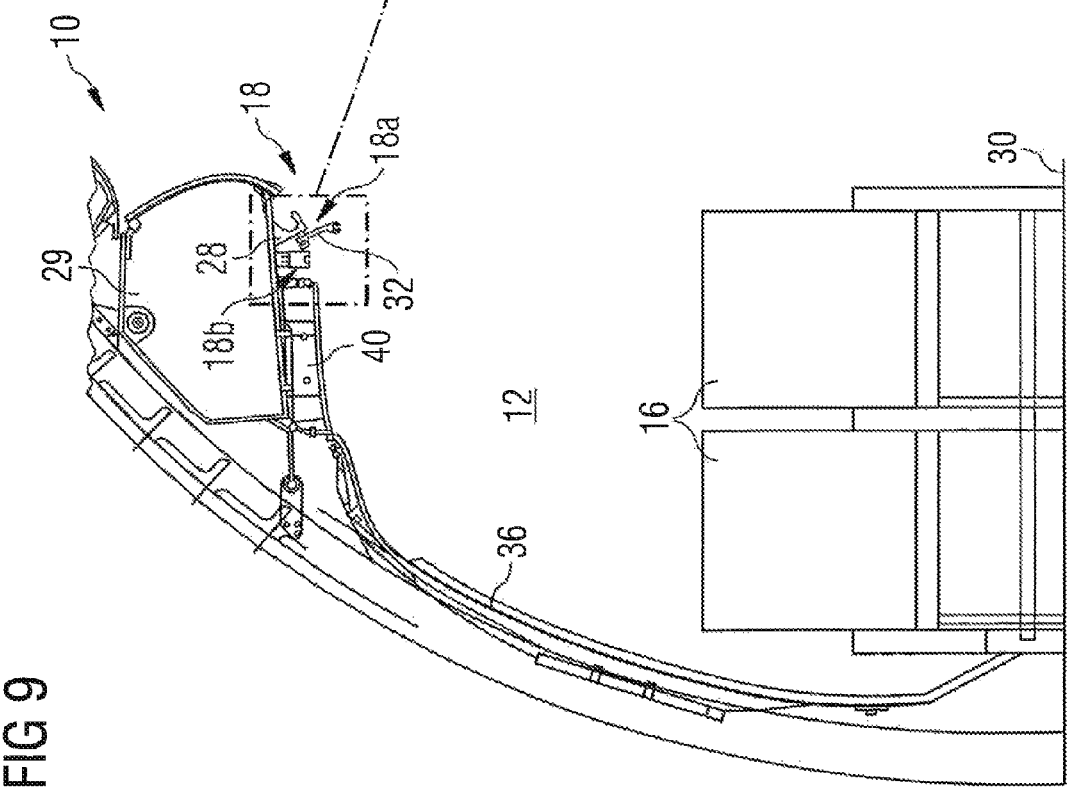

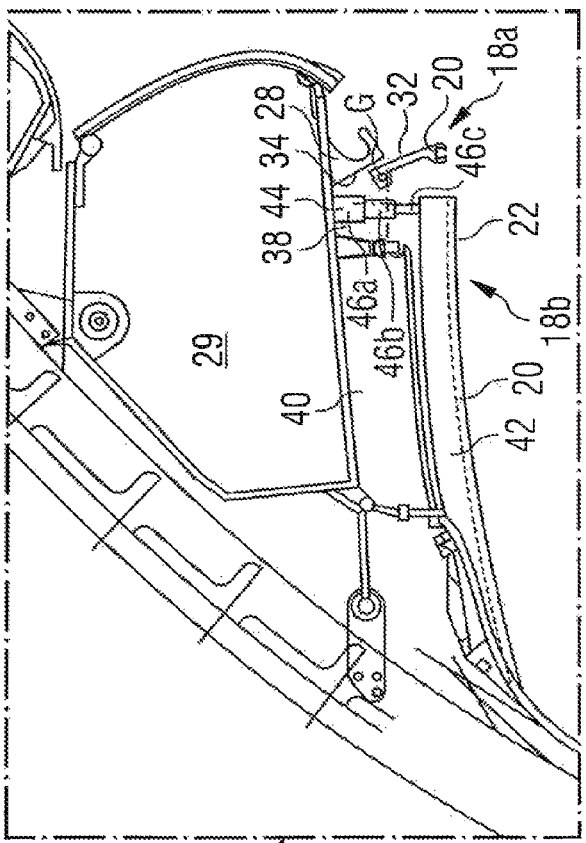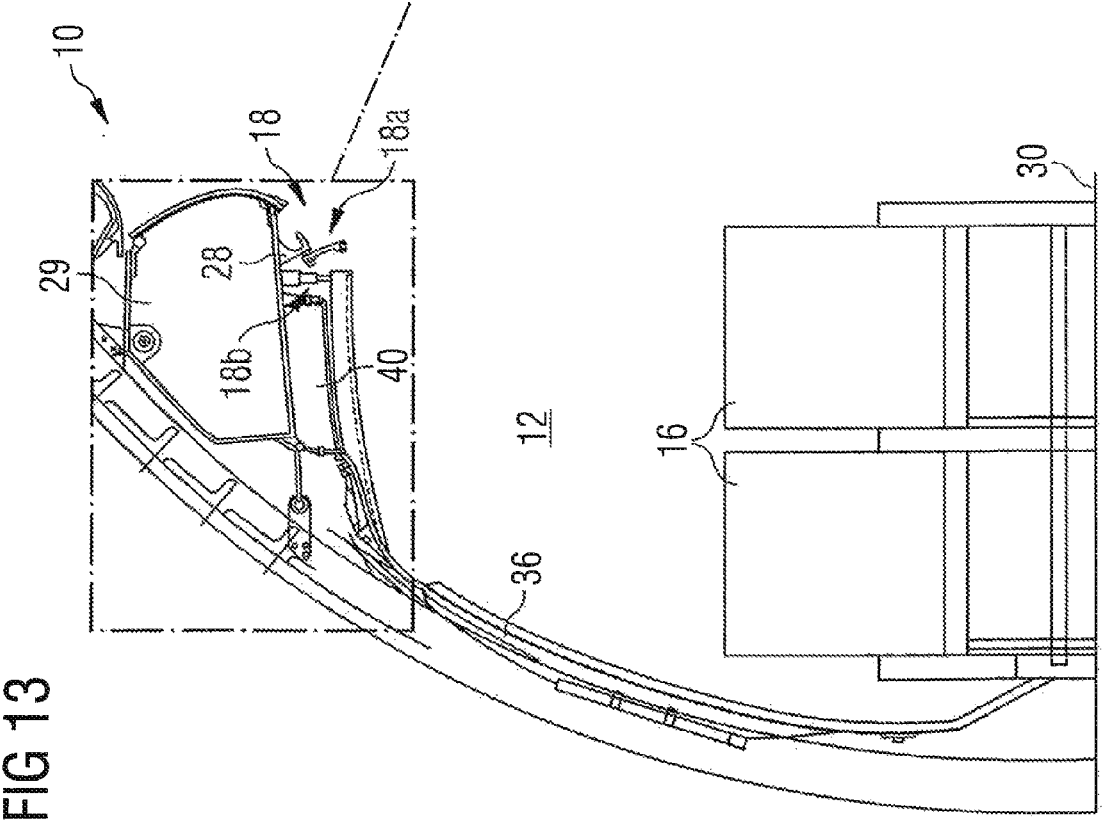

DEVICE FOR DELIMITING A CREW REST COMPARTMENT AND METHOD FOR IMPLEMENTING SUCH A DEVICE

CROSS-REFERENCE TO RELATED APPLICATION

This application claims priority to U.S. Provisional Patent Application No. 61/242,581 filed Sep. 15, 2009 and German Patent Application No. 10 2009 041 581.5, filed Sep. 15, 2009, the disclosures of which are incorporated herein by reference.

FIELD OF THE INVENTION

The invention relates to a device for delimiting a crew rest area in an aircraft passenger cabin. Furthermore, the invention relates to a method for putting into operation such a device for delimiting a crew rest area in an aircraft passenger cabin.

BACKGROUND OF THE INVENTION

Modern commercial aircraft usually have crew rest rooms, so-called crew rest compartments, which are situated outside the region of the aircraft cabin accessible to passengers, for example in an underfloor region of the aircraft cabin. The crew rest compartments can be used by the crew members, in particular on long-haul flights, for rest breaks. In addition to the crew rest compartments situated outside the region of the aircraft cabin accessible to passengers, normally crew rest areas which are disposed directly in the passenger cabin itself are also provided. These crew rest areas, also referred to as curtain crew rest compartments, are formed by a limited number of seat rows, i.e. for example two seat rows disposed one behind the other, which are separated from the rest of the cabin by a curtain. The curtain separating the curtain crew rest compartment from the rest of the cabin is usually fastened by means of a rod-shaped curtain rail which is fitted via special installation devices below the overhead luggage compartments in the passenger cabin.

The installation of the rod-shaped curtain rail, for example during the final assembly of the aircraft passenger cabin, is relatively complex. Moreover, the rod-shaped curtain rail has to be provided with a special head protection profile for safety reasons, i.e. to avoid injuries to the passengers and the crew members. However, the head protection profile is not only expensive, but also undesirably increases the weight of the curtain crew rest compartment, as do the installation devices for fastening the curtain rail. A further disadvantage of curtain crew rest compartments customary at present is the relatively unaesthetic effect of the overall construction of the compartments. Finally, the curtain and the rod-shaped curtain rail have to be inconveniently removed and stowed, for example, in a free luggage compartment when the curtain crew rest compartment is not required, for example on short-haul flights, and the seat rows provided for the curtain crew rest compartment are to be used for conveying passengers.

SUMMARY OF THE INVENTION

The object underlying the present invention is to provide a particularly flexibly usable device for delimiting a crew rest area in an aircraft passenger cabin and also a method for putting into operation such a device for delimiting a crew rest area in an aircraft passenger cabin.

This object is achieved by a device for delimiting a crew rest area in an aircraft passenger cabin having the features of claim 1 and also a method for putting into operation a device for delimiting a crew rest area in an aircraft passenger cabin having the features of claim 13.

The device according to the invention for delimiting a crew rest area in an aircraft passenger cabin comprises a curtain which is adapted to separate at least one seat disposed in the aircraft passenger cabin from a region of the aircraft passenger cabin surrounding the seat. The curtain may consist of a fabric, but also of any other material, for example a plastics material. The properties of the curtain can be controlled as desired by a suitable choice of material. For example, the use of a stiffer material for producing the curtain is advantageous when the curtain is to have a high dimensional stability. In contrast, the use of a soft, flowing material is expedient when a low weight and a low stowage volume of the curtain are more important. The size of the curtain is preferably chosen so that it can separate a crew rest area of any size from a region of the aircraft passenger cabin surrounding the crew rest area. The crew rest area here can comprise merely one seat or one seat row, but also a plurality of seat rows preferably disposed one behind the other. The seat or seats of the crew rest area can be economy class seats, business class seats or first class seats.

Furthermore, the delimiting device according to the invention comprises a fastening device for fastening the curtain in the aircraft passenger cabin. According to the invention, at least a first part of the fastening device is fixed to a grip rail intended for installation in the aircraft passenger cabin or formed integral with the grip rail intended for installation in the aircraft passenger cabin. Preferably, the grip rail is intended to extend, in its state installed in the aircraft passenger cabin below overhead luggage compartments fastened in a ceiling region of the aircraft passenger cabin, in the direction of a longitudinal axis of the aircraft passenger cabin. In the case of the device according to the invention for delimiting a crew rest area in an aircraft passenger cabin, the grip rail thus performs a dual function, serving on the one hand as a holding device for people present in the aircraft passenger cabin and at the same time as a carrier for the fastening device for fastening the curtain of the delimiting device according to the invention.

The fastening device fixed to the grip rail or formed integral with the grip rail can be installed in the aircraft passenger cabin simply and conveniently together with the grip rail during the final assembly of the aircraft passenger cabin. The aesthetic effect of the passenger cabin is impaired much less by the fastening device fixed to the grip rail or integrated into the grip rail than by a fastening device designed in the form of a separate component. Furthermore, in the case of the delimiting device according to the invention, at least complete removal of the fastening device when the crew rest area is not required, for example on short-haul flights, can be dispensed with.

Advantageously, the first part of the fastening device is adapted to fasten a curtain section which, when installed in the aircraft passenger cabin, separates, in the direction of a longitudinal axis of the aircraft passenger cabin, the at least one seat disposed in the aircraft passenger cabin from the region of the aircraft passenger cabin surrounding the seat. In principle, the fastening device of the delimiting device according to the invention may consist merely of a first part. Such an arrangement is expedient, for example, when the crew rest area is situated between two monuments subdividing the aircraft passenger cabin perpendicularly to the longitudinal axis of the aircraft passenger cabin, i.e. no end-side separation of the crew rest area extending substantially perpendicularly to the longitudinal axis of the aircraft cabin is required.

However, the fastening device may, as required, also comprise at least one second part which is adapted to fasten a curtain section which, when installed in the aircraft passenger cabin, ensures an end-side separation of the crew rest area, i.e. a separation of the crew rest area in a direction substantially perpendicular to the longitudinal axis of the aircraft passenger cabin. Finally, the fastening device may also comprise a third part which is adapted to fasten a curtain section which, when installed in the aircraft passenger cabin, extends parallel to the curtain section to be fastened by means of the first part of the fastening device in the direction of the longitudinal axis of the aircraft passenger cabin. Such an arrangement is expedient when the crew rest area is to extend over merely one seat or selected seats of a seat row.

The first part of the fastening device may comprise a curtain rail which is fastened to a surface of the grip rail or formed in a surface of the grip rail which, when the grip rail is installed in the aircraft passenger cabin, extends in the direction of the longitudinal axis of the aircraft passenger cabin and faces a floor of the aircraft passenger cabin. The curtain section which then extends along the longitudinal axis of the aircraft passenger cabin from the grip rail in the direction of the floor of the aircraft passenger cabin may then be simply and conveniently hung in the curtain rail of the fastening device. Particularly when the curtain rail is formed directly in a surface of the grip rail, a head protection profile for avoiding injuries to people present in the aircraft passenger cabin can be dispensed with. The fastening device may then be implemented in a particularly weight-saving and cost-effective manner.

The first part of the fastening device may comprise merely a curtain rail fastened to a surface of the grip rail or formed in a surface of the grip rail. Additionally or alternatively to this, however, the first part of the fastening device may also comprise a pivoting lever pivotably attached to the grip rail and carrying a curtain rail. Preferably, the pivoting lever is pivotable between a rest position and an operating position in such a way that the curtain rail provided on the pivoting lever extends in the direction of the longitudinal axis of the aircraft passenger cabin and faces a floor of the aircraft passenger cabin when the pivoting lever is installed in the aircraft passenger cabin and is situated in its operating position. When the pivoting lever is situated in its operating position, the curtain section may thus again be simply and conveniently hung in the curtain rail provided on the pivoting lever, in order to separate the crew rest area in the direction of the longitudinal axis of the aircraft passenger cabin from the region of the aircraft passenger cabin surrounding the crew rest area. In its rest position, in contrast, the pivoting lever does not present any risk of injury to people present in the aircraft passenger cabin, so that a head protection profile can also be dispensed with when the first part of the fastening device is equipped with a pivoting lever.

Preferably, the pivoting lever is pivotably attached to a surface of the grip rail which, when the grip rail is installed in the aircraft passenger cabin, extends in the direction of the longitudinal axis of the aircraft passenger cabin and faces a side wall of the aircraft passenger cabin. In other words, the pivoting lever is articulated on a surface of the grip rail which is situated on a rear side of the grip rail facing away from an aisle region of the aircraft passenger cabin. In such an arrangement, the visual appearance of the grip rail is not impaired by the pivoting lever, particularly when the pivoting lever is situated in its rest position.

Preferably, the pivoting lever is dimensioned so that, in its rest position, it is capable of bridging a gap which is present in the aircraft passenger cabin between the grip rail and a personal service unit. The personal service unit is usually installed in an aircraft passenger cabin in the region of an underside of overhead luggage compartments disposed above the passenger seats and comprises, for example, individual ventilation nozzles, loudspeakers or indicating devices for displaying seat belt-fastening signs, non-smoking signs or the like. A pivoting lever which in its rest position bridges a gap present between the grip rail and a personal service unit ensures an aesthetically particularly attractive appearance of the aircraft passenger cabin.

As already mentioned, the fastening device may comprise a second part which is adapted to fasten a curtain section which, in its state installed in the aircraft passenger cabin, separates, in a direction substantially perpendicular to the longitudinal axis of the aircraft passenger cabin, the at least one seat disposed in the aircraft passenger cabin from the region of the aircraft passenger cabin surrounding the seat. It goes without saying that the fastening device may, if required, also have two second parts in order to ensure a front and also a rear end-side separation of the crew rest area.

The second part of the fastening device may comprise a holder pivotably attachable to an interior fitting component of the aircraft passenger cabin and carrying a curtain rail. For example, the holder may be intended for fastening to an underside of an overhead luggage compartment. Alternatively to this, however, a fastening of the holder to the grip rail or to a personal service unit is also conceivable. The holder is preferably pivotable between a rest position and an operating position in such a way that the curtain rail provided on the holder extends in a direction substantially perpendicular to the longitudinal axis of the aircraft passenger cabin and faces a floor of the aircraft passenger cabin when the holder is installed in the aircraft passenger cabin and is situated in its operating position. In its operating position, the holder thus enables a section of the curtain, which, when installed in the aircraft passenger cabin, ensures a separation of the crew rest area in a direction substantially perpendicular to the longitudinal axis of the aircraft passenger cabin, to be hung simply in the curtain rail.

Preferably, the holder is pivotable between a rest position and an operating position in such a way that the curtain rail provided on the holder extends in the direction of the longitudinal axis of the aircraft passenger cabin and faces a floor of the aircraft passenger cabin when the holder is installed in the aircraft passenger cabin and is in its rest position. In other words, the holder may preferably be pivoted by about 90° in order to move the holder from its rest position into its operating position.

In a particularly preferred embodiment of the device according to the invention for delimiting a crew rest area in an aircraft passenger cabin, the holder is dimensioned so that, in its rest position, it is capable of being accommodated in a gap which is present in the aircraft passenger cabin between the grip rail and a personal service unit. The holder may then be stowed particularly conveniently in its rest position in the gap and, if required, be pivoted by about 90° relative to the gap into its operating position. By accommodating the holder in the gap, it is possible to dispense with the need to provide the holder with a head protection profile, since the holder accommodated in the gap does not present any risk of injury to people present in the aircraft passenger cabin. Furthermore, the holder in its rest position does not impair the aesthetic appearance of the aircraft passenger cabin.

The holder may be pivotably attachable via a telescopic base to the interior fitting component of the aircraft passenger cabin. The telescopic base preferably comprises a plurality of telescopic elements slidable one into another, so that the telescopic foot is adjustable between a pushed-together position and an expanded position. With the aid of the telescopic base, the holder may first be moved out of the gap between the grip rail and the personal service unit before it is pivoted from its rest position into its operating position. This enables unobstructed pivoting of the holder. In such an arrangement, it is furthermore possible to bridge the gap between the grip rail and the personal service unit in which the holder is accommodated by the pivoting lever pivotably articulated on the grip rail, in order to obtain a visually particularly unimpaired impression of the aircraft passenger cabin.

The curtain rail provided on the first and/or the second part of the fastening device may comprise a groove for receiving at least one connecting device fastened to the curtain. The curtain rail may then be designed particularly simply. The connecting device may be a curtain roller or a curtain slide. What is merely essential is that the shape of the connecting device matches the shape of the groove in such a way that the connecting device may be displaceably received in the groove.

In a method according to the invention for putting into operation a device for delimiting a crew rest area in an aircraft passenger cabin, there is provided a curtain which is adapted to separate at least one seat disposed in the aircraft passenger cabin from a region of the aircraft passenger cabin surrounding the seat. When the crew rest area is not required, the curtain may be stowed, for example, in a free overhead luggage compartment or at another location in the aircraft passenger cabin. The curtain is fastened in the aircraft passenger cabin by means of a fastening device, at least a first part of which is fixed to a grip rail installed in the aircraft passenger cabin or formed integral with the grip rail installed in the aircraft passenger cabin. The crew rest area may thereby be simply and conveniently put into operation without the need to install separate components in the aircraft passenger cabin.

By means of the first part of the fastening device preferably a curtain section is fastened which, when installed in the aircraft passenger cabin, separates, in the direction of a longitudinal axis of the aircraft passenger cabin, the at least one seat disposed in the aircraft passenger cabin from the region of the aircraft passenger cabin surrounding the seat. Furthermore, by means of a second part of the fastening device a curtain section may be fastened which, when installed in the aircraft passenger cabin, separates, in a direction substantially perpendicular to the longitudinal axis of the aircraft passenger cabin, the at least one seat disposed in the aircraft passenger cabin from the region of the aircraft passenger cabin surrounding the seat. In other words, the second part of the fastening device serves for fastening a curtain section for the end-side separation of the crew rest area. If desired or required, it is of course possible to use two second parts of the fastening device in order to ensure a front and also a rear end-side separation of the crew rest area from the region of the aircraft passenger cabin surrounding the crew rest area.

The fastening of a curtain section in the aircraft passenger cabin by means of the first part of the fastening device may comprise the fastening of the curtain section to the first part of the fastening device via a curtain rail which is fastened to a surface of the grip rail or formed in a surface of the grip rail which, when the grip rail is installed in the aircraft passenger cabin, extends in the direction of the longitudinal axis of the aircraft passenger cabin and faces a floor of the aircraft passenger cabin. Alternatively or additionally to this, fastening the curtain section to the first part of the fastening device may take place via a curtain rail which is provided on a pivoting lever pivotably attached to the grip rail. The pivoting lever is preferably pivoted, before the fastening of the curtain section, from a rest position, in which it bridges for example a gap which is present in the aircraft passenger cabin between the grip rail and a personal service unit, into an operating position, in which the curtain rail provided on the pivoting lever extends in the direction of the longitudinal axis of the aircraft passenger cabin and faces a floor of the aircraft passenger cabin.

Additionally or alternatively to this, the fastening of a curtain section in the aircraft passenger cabin by means of the second part of the fastening device may comprise the fastening of the curtain section to the second part of the fastening device via a curtain rail which is provided on a holder pivotably attached to an interior fitting component of the aircraft passenger cabin, for example an underside of an overhead luggage compartment, of the grip rail or of a personal service unit. The holder is preferably pivoted, before the fastening of the curtain section, from a rest position, in which the curtain rail provided on the holder extends in the direction of the longitudinal axis of the aircraft passenger cabin and faces a floor of the aircraft passenger cabin and in which the holder is accommodated in particular in the gap which is present in the aircraft passenger cabin between the grip rail and a personal service unit, into an operating position, in which the curtain rail provided on the holder extends in a direction substantially perpendicular to the longitudinal axis of the aircraft passenger cabin and faces a floor of the aircraft passenger cabin. Before the pivoting of the holder from its rest position into its operating position, a telescopic base, via which the holder is pivotably attached to the interior fitting component of the aircraft passenger cabin, may be moved into an expanded position in order to enable unobstructed pivoting of the holder out of the gap between the grip rail and a personal service unit.

BRIEF DESCRIPTION OF THE DRAWINGS

Preferred embodiments of the present invention will now be explained in more detail with reference to the attached schematic figures, of which FIG. 3 shows a cross-sectional illustration of a second embodiment of a device for delimiting a crew rest area in an aircraft passenger cabin with a fastening device, the first part of which comprises a pivoting lever pivotably attached to a grip rail and carrying a curtain rail, the pivoting lever being situated in its rest position in the illustration according to FIG. 3, FIG. 4 shows a detail illustration of the arrangement according to FIG. 3, FIG. 9 shows the device for delimiting a crew rest area in an aircraft passenger cabin according to FIG. 7, the pivoting lever of the first part of the fastening device being situated, however, in its operating position, FIG. 10 shows a detail illustration of the arrangement according to FIG. 9, FIG. 13 shows the device for delimiting a crew rest area in an aircraft passenger cabin according to FIG. 11, the holder of the second part of the fastening device being situated, however, in its operating position, FIG. 14 shows a detail illustration of the arrangement according to FIG. 13.

DESCRIPTION OF THE ILLUSTRATIVE EMBODIMENTS

Figure 2:
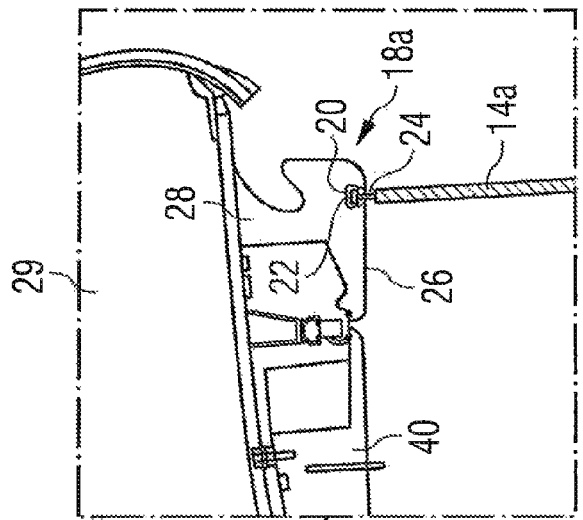
FIG. 2 shows a detail illustration of the arrangement according to FIG. 1.

The figures each show a device 10 which serves for delimiting a crew rest area 12, which is also referred to as a curtain crew rest compartment and is disposed in the region of an aircraft passenger cabin also accessible to passengers, from a region of the aircraft passenger cabin surrounding the crew rest area. The device 10 comprises a curtain 14 which, in the embodiments of the device 10 shown in the figures, is adapted to separate two rows of seats 16, one row disposed behind the other, from a region of the aircraft passenger cabin surrounding the seats 16.

To fasten the curtain 14 in the aircraft passenger cabin, a fastening device 18 is provided. The fastening device 18 comprises a first part 18a which is adapted to fasten a curtain section 14a which, in its state installed in the aircraft passenger cabin, separates, in the direction of a longitudinal axis of the aircraft passenger cabin, the seats 16 situated in the crew rest area 12 from the region of the aircraft passenger cabin surrounding the seat 16. In other words, the curtain section 14a in its state installed in the aircraft passenger cabin separates the seats 16 situated in the crew rest area 12 from an aisle region of the aircraft passenger cabin.

Figure 1:
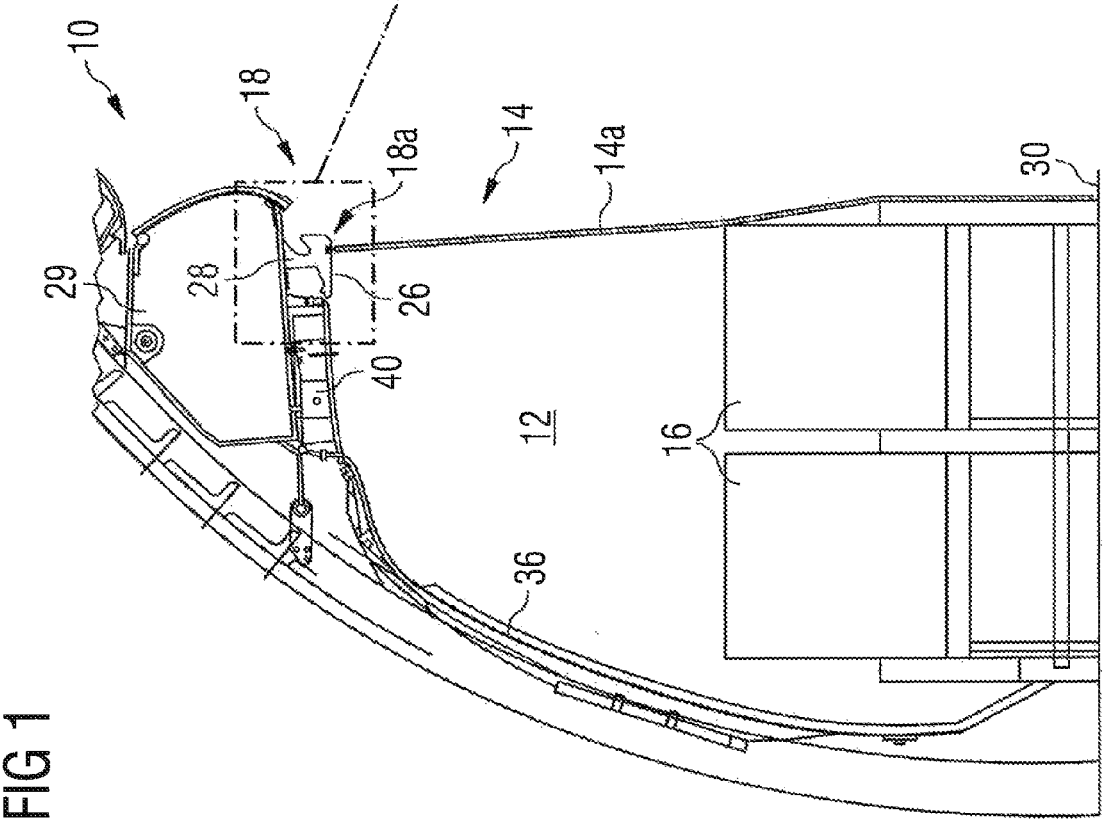
FIG. 1 shows a cross-sectional illustration of a first embodiment of a device for delimiting a crew rest area in an aircraft passenger cabin with a fastening device, the first part of which comprises a curtain rail integrated into a surface of a grip rail.

In the embodiment of the device 10 illustrated in FIGS. 1 and 2, the first part 18a of the fastening device 18 comprises a curtain rail 20 which is provided with a groove 22. The groove 22 of the curtain rail 20 is intended to displaceably receive a plurality of connecting devices 24 fastened to the curtain section 14a. By the displacement of the connecting devices 24 in the groove 22 of the curtain rail 20, the curtain section 14a can be opened and closed, as desired, in the direction of the longitudinal axis of the aircraft passenger cabin. The curtain rail 20, i.e. the groove 22 of the curtain rail 20, is formed in a surface 26 of a grip rail 28 which, in state of the grip rail 28 illustrated in FIGS. 1 and 2 when installed in the aircraft passenger cabin, extends in the direction of the longitudinal axis of the aircraft passenger cabin and faces a floor 30 of the aircraft passenger cabin. In the arrangements shown in the figures, the grip rail 28 is in each case fastened to an underside of a row of overhead luggage compartments 29 and thus performs a dual function, serving on the one hand as a holding device for people present in the aircraft passenger cabin and at the same time as a carrier device for the first part 18a of the fastening device 18.

In a second embodiment, illustrated in FIGS. 3 to 15, of a device 10 for delimiting a crew rest area 12 in an aircraft passenger cabin, the first part 18a of the fastening device 18 does not comprise a curtain rail 20 fixedly integrated into a surface of the grip rail 28. Instead, the first part 18a of the fastening device 18 is provided with a pivoting lever 32 which is articulated on a surface 34 of the grip rail 28 which, in the state of the grip rail 28 when installed in the aircraft passenger cabin, extends in the direction of the longitudinal axis of the aircraft passenger cabin and faces a side wall 36 of the aircraft passenger cabin, i.e. faces away from an aisle region of the aircraft passenger cabin. In its rest position shown in FIGS. 3 and 4, the pivoting lever 32 bridges a gap 38 present in the aircraft passenger cabin between the grip rail 28, i.e. the surface 34 of the grip rail 28 facing the side wall 36 and facing away from the aisle region of the aircraft passenger cabin, and a personal service unit 40. The personal service unit is, similar to the grip rail 28, installed on an underside of an overhead luggage compartment 29 and can comprise, for example, individual ventilation nozzles, loudspeakers and indicating elements.

Figure 6:
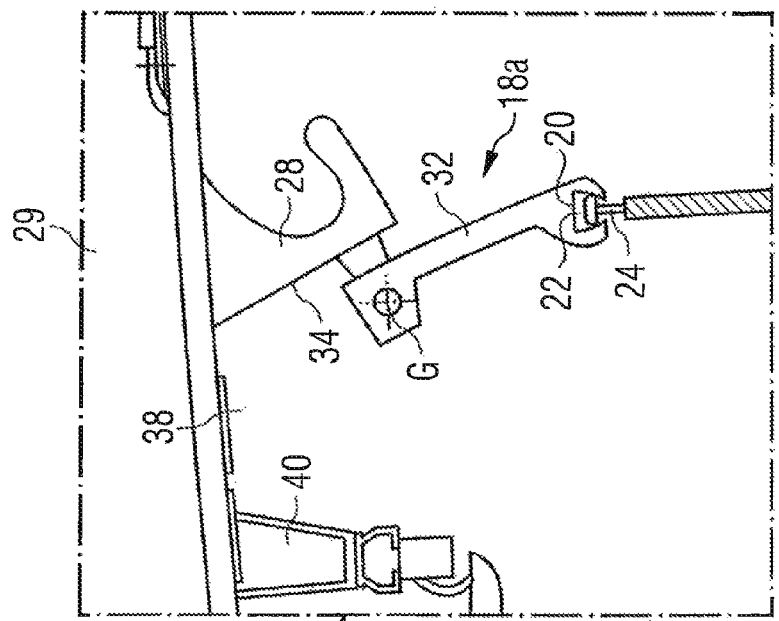
FIG. 6 shows a detail illustration of the arrangement according to FIG. 5.
Figure 5:
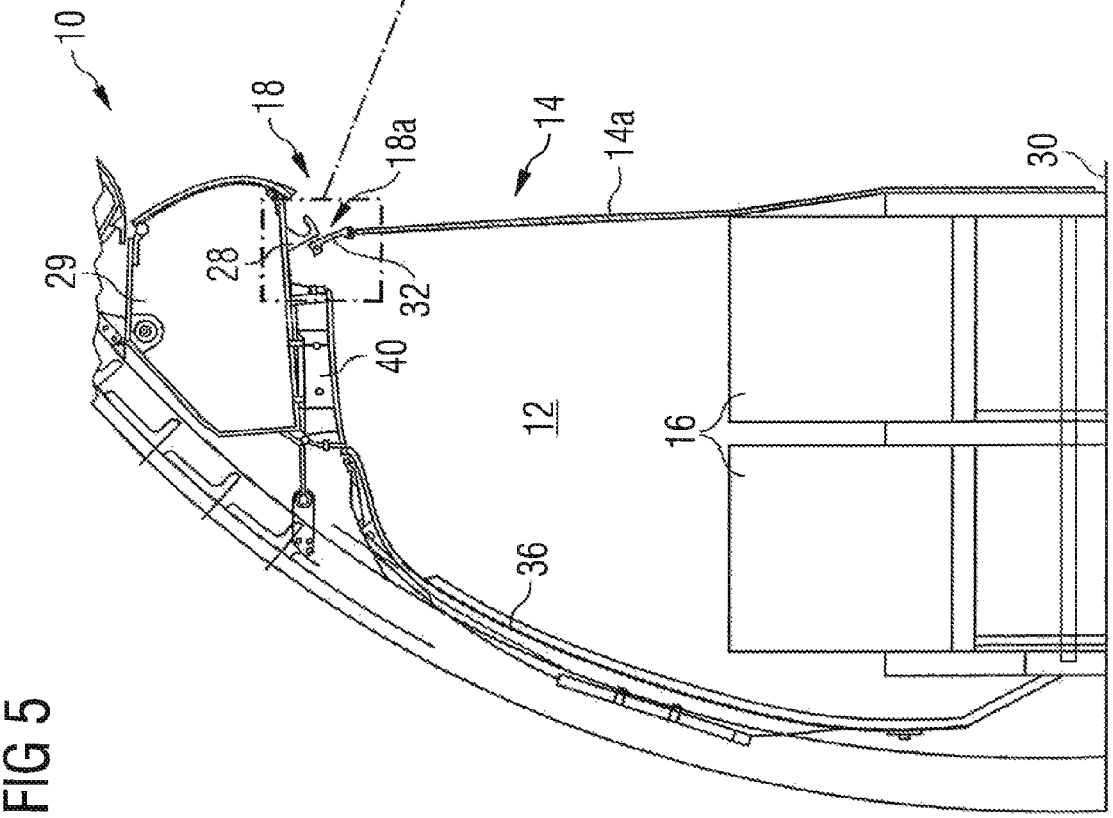
FIG. 5 shows a cross-sectional illustration of the device for delimiting a crew rest area in an aircraft passenger cabin according to FIG. 3, the pivoting lever being situated, however, in its operating position and a curtain section being hung in the curtain rail formed on the pivoting lever.

As is most clearly seen from the detail illustrations of FIGS. 4 and 6, the pivoting lever 32 is pivotable about a pivot point G disposed at a first end of the pivoting lever 32. At its second end opposite the first end, in contrast, the pivoting lever 32 carries a curtain rail 20, which again is provided with a groove 22 for displaceably receiving a plurality of connecting devices 24 fastened to the first curtain section 14a. When the pivoting lever 32, as shown in FIGS. 5 and 6, is situated in its operating position, the curtain rail 20 formed on the second end of the pivoting lever 32 extends in the direction of the longitudinal axis of the aircraft passenger cabin and faces the floor 30 of the aircraft passenger cabin.

The fastening device 18 of the device 10 for delimiting a crew rest area 12 in an aircraft passenger cabin furthermore comprises a second part 18b which is adapted to fasten a curtain section 14b which, in its state installed in the aircraft passenger cabin, separates the crew rest area 12, i.e. the seats 16 disposed in the crew rest area 12, in a direction substantially perpendicular to the longitudinal axis of the aircraft passenger cabin, from the region of the aircraft passenger cabin surrounding the crew rest area 12. In other words, the second part 18b of the fastening device 18 serves for fastening a curtain section 14b which ensures an end-side separation of the crew rest area 12 from the region of the aircraft passenger cabin surrounding the crew rest area 12.

If the crew rest area 12 is positioned in the aircraft passenger cabin in such a way that a front or a rear end-side delimitation of the crew rest area 12 is implemented by a monument fixedly installed in the aircraft passenger cabin, for example a dividing wall or the like, the device 10 can comprise merely one second fastening device part 18b. If both a front and a rear end-side delimitation of the crew rest area 12 from the region of the aircraft passenger cabin surrounding the crew rest area 12 is possible by monuments fixedly installed in the aircraft passenger cabin, the second part 18b of the fastening device 18 can even be completely dispensed with. Of course, it is also possible, however, to equip the device 10 for delimiting a crew rest area 12 in an aircraft passenger cabin with two second fastening device parts 18b for the front and rear end-side delimitation of the crew rest area 12 from the region of the aircraft passenger cabin surrounding the crew rest area 12.

The second part 18b of the fastening device 18 comprises a holder 42 which is fixed via a telescopic base 44 to the underside of the overhead luggage compartments 29. As becomes clear in particular from FIGS. 12 and 14, the telescopic base 44 comprises three telescopic elements 46a, 46b, 46c displaceable relative to one another, so that the telescopic base 44 can assume either a pushed-together position illustrated in FIGS. 7 to 10 or an expanded position illustrated in FIGS. 11 to 15.

Figure 8:
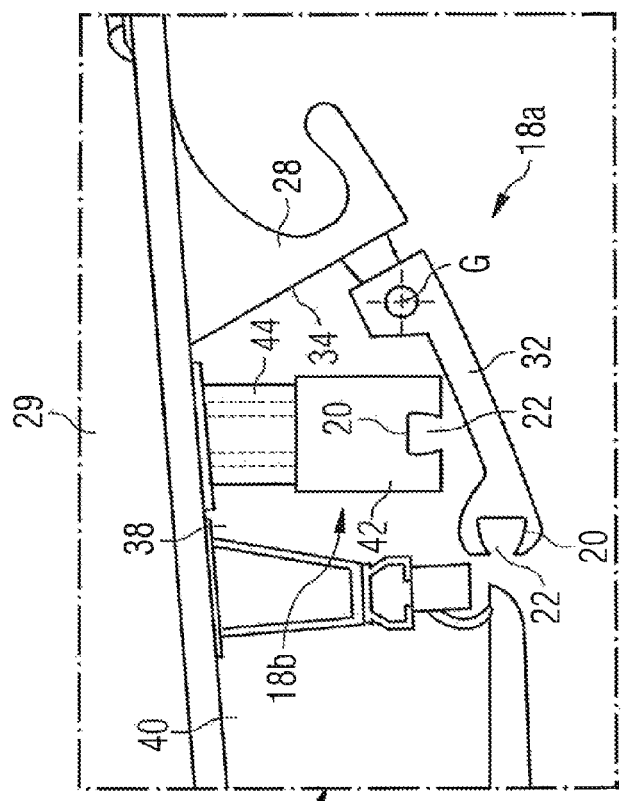
FIG. 8 shows a detail illustration of the arrangement according to FIG. 7.
Figure 7:
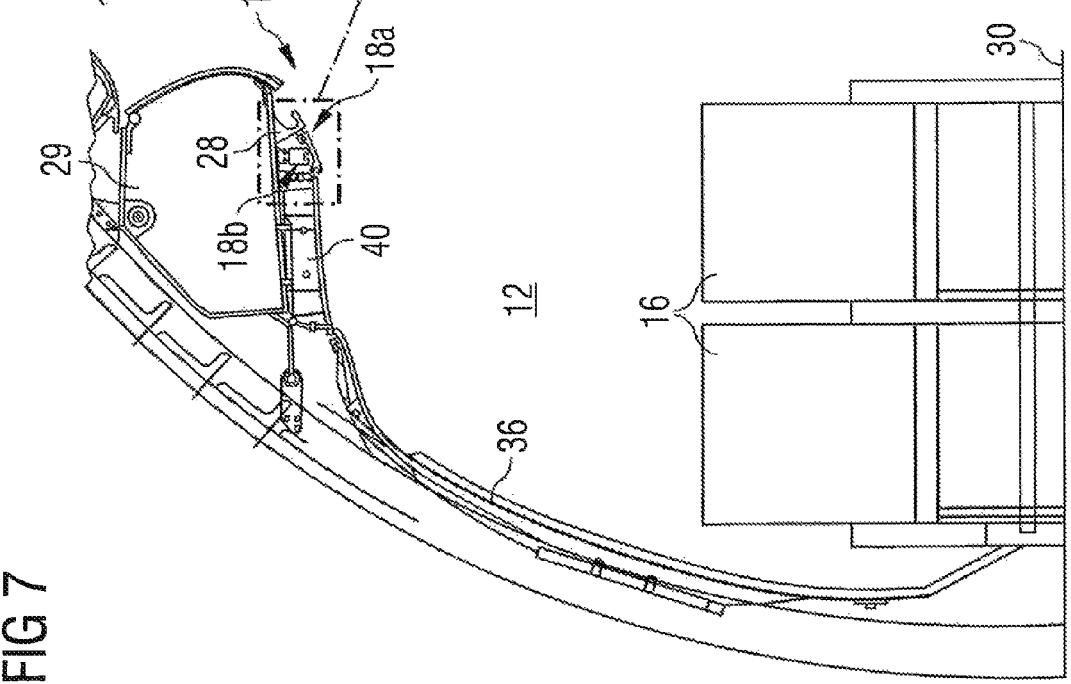
FIG. 7 shows a cross-sectional illustration of a device for delimiting a crew rest area in an aircraft passenger cabin according to FIG. 3, which, in addition to the first part of the fastening device, also illustrates a second part of the fastening device with a holder carrying a curtain rail and pivotable between a rest position and an operating position, both the pivoting lever of the first part of the fastening device and the holder of the second part of the fastening device being situated in their rest positions in the illustration according to FIG. 7.
Figure 12:
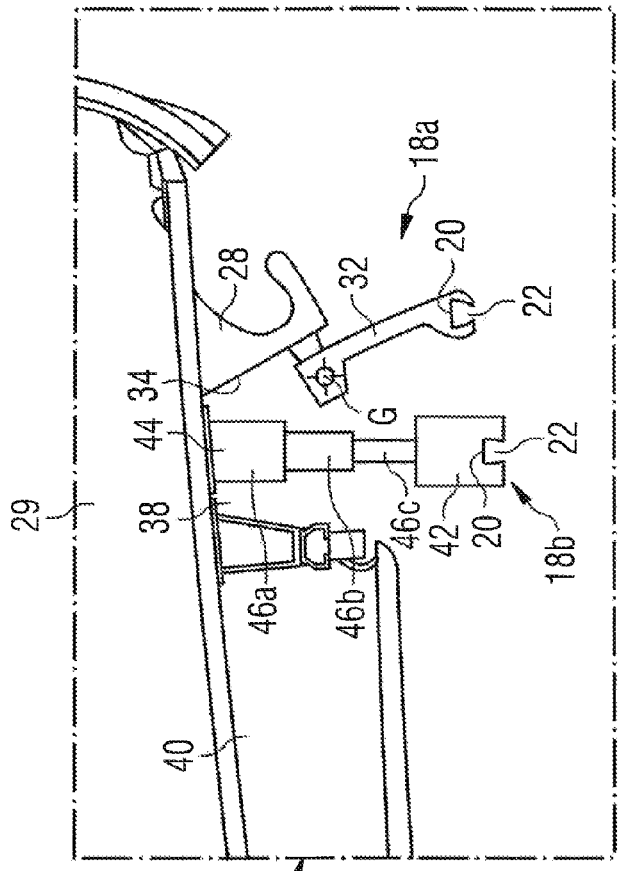
FIG. 12 shows a detail illustration of the arrangement according to FIG. 11.
Figure 11:
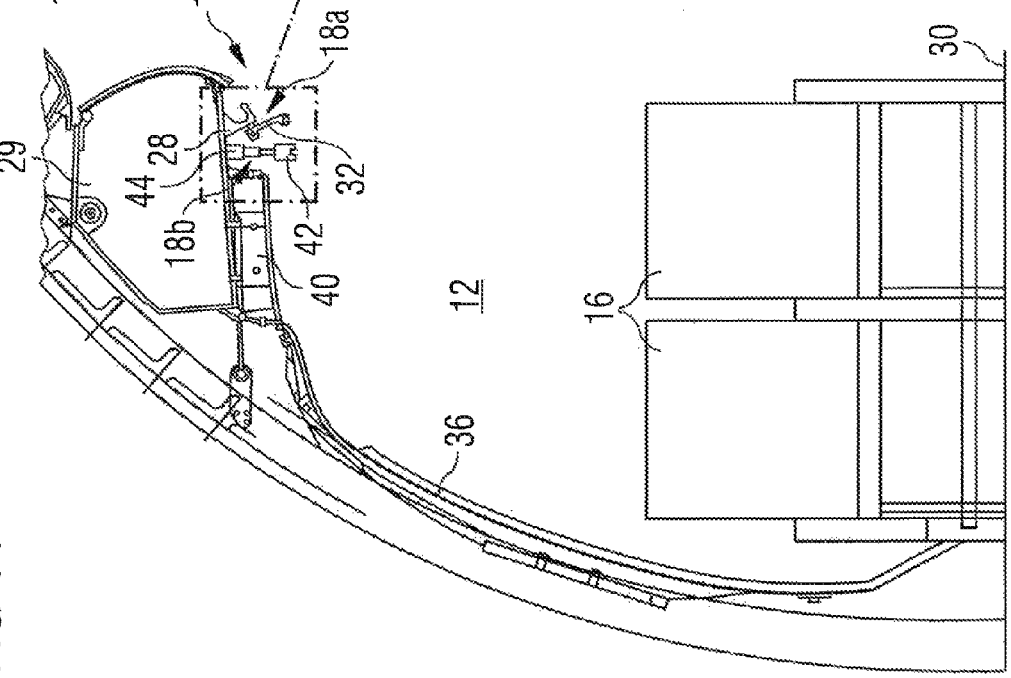
FIG. 11 shows the device for delimiting a crew rest area in an aircraft passenger cabin according to FIG. 9, a telescopic base for fastening the holder of the second part of the fastening device to an underside of an overhead luggage compartment being situated, however, in an expanded position.
Figure 15:
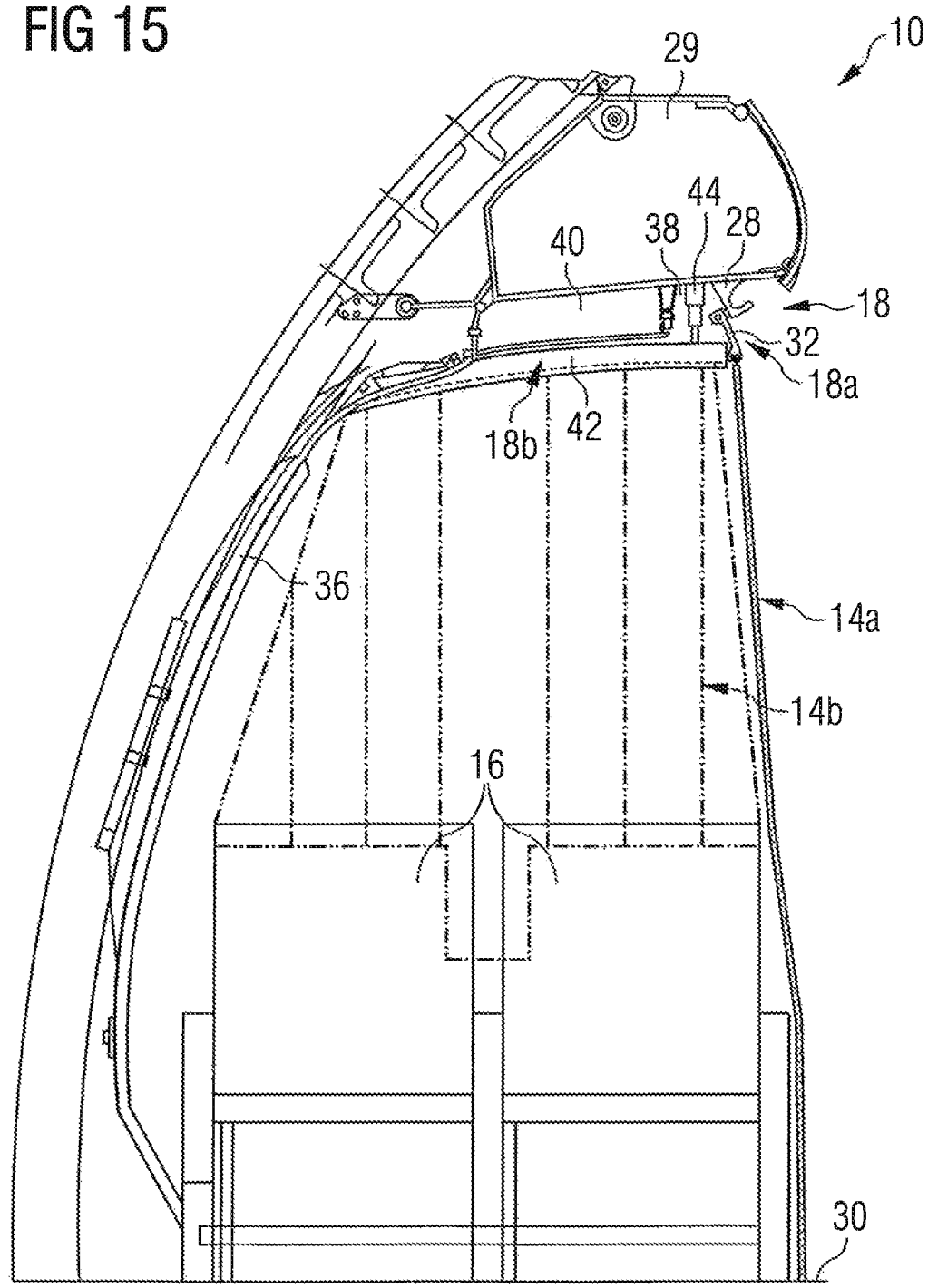
FIG. 15 shows the device for delimiting a crew rest area in an aircraft passenger cabin according to FIG. 13 with curtain sections fastened to the first and also the second part of the fastening device.

As can be seen in particular in FIGS. 8 and 10, the holder 42 is accommodated in its rest position in the gap 38, bridged by the pivoting lever 32, between the grip rail 28 and the personal service unit 40. In order to move the holder 42 from its rest position into its operating position, it is first necessary to pivot the pivoting lever 32 from its rest position into its operating position, in which it frees the gap between the grip rail 28 and the personal service unit 40 (see FIGS. 9 and 10). Then, the telescopic base 44 can be moved into its expanded position, so that the holder 42 is situated outside the gap 38 between the grip rail 28 and the personal service unit 40 (see FIGS. 11 and 12). Finally, the holder 42 can be pivoted by about 90°, so that it extends no longer parallel to the longitudinal axis of the aircraft passenger cabin, but substantially perpendicular to the longitudinal axis of the aircraft passenger cabin in the direction of the side wall 36 of the aircraft passenger cabin (see FIGS. 13 and 14).

Similar to the pivoting lever 32, the holder 42 also carries a curtain rail 20 which is again provided with a groove 22. When the holder 42 is situated in its rest position in the gap 38 between the grip rail 28 and the personal service unit 40, the curtain rail 20 extends in the direction of the longitudinal axis of the aircraft passenger cabin and faces the floor 30 of the aircraft passenger cabin. When the holder 42, in contrast, is situated in its operating position, the curtain rail 20 provided in the holder extends in a direction substantially perpendicular to the longitudinal axis of the aircraft passenger cabin and faces the floor 30 of the aircraft passenger cabin. The curtain section 14b which ensures the end-side delimitation of the crew rest area 12 from the region of the aircraft passenger cabin surrounding the crew rest area 12 is again fastened to the holder 42 by means of a plurality of connecting devices 24 which can be displaceably received in the groove 22 of the curtain rail 20.

FIGS. 7 to 15 show the second part 18b of the fastening device 18 in combination with a first part 18a of the fastening device 18 comprising a pivoting lever 32. It goes without saying, however, that the second part 18b of the fastening device 18 comprising the holder 42 can also be combined with a first part 18a of the fastening device 18, illustrated in FIGS. 1 and 2, which comprises a curtain rail integrated into a surface 26 of the grip rail 28.

For the installation of the device 10 in the aircraft passenger cabin, it is merely necessary to fix the holder 42 of the second part 18b of the fastening device 18 by means of the telescopic base 44 to the underside of the overhead luggage compartments 29. The first part 18a of the fastening device 18 can, in contrast, already be preassembled outside the aircraft with the grip rail 28 to form an assembly which can be handled independently, irrespective of whether it comprises a curtain rail 20 integrated into the surface 26 of the grip rail 28 or a pivoting lever 32 articulated on the surface 34 of the grip rail 28. During the final assembly of the aircraft passenger cabin, it is then merely necessary to install the grip rail 28 with the first fastening device part 18a formed integral therewith or fastened thereto.

When the crew rest area 12 is not needed, for example on short-haul flights or the like, the curtain 14 can be stowed in a space-saving manner, for example in a free overhead luggage compartment 29 or at another location in the aircraft passenger cabin. It is not necessary, however, to remove the first or second part 18a, 18b of the fastening device 18 for fastening the curtain 14. Rather, in the case of a fastening device 18 which comprises a first fastening device part 18a integrated into the grip rail 28, the second part 18b of the fastening device 18, i.e. the holder 42, merely has to be moved into its rest position. In the case of a fastening device 18 having a first part 18a with a pivoting lever 32, the pivoting lever 32 must additionally be pivoted into its rest position, in which it bridges the gap 38 between the grip rail 28 and the personal service unit 40.

Similarly, for putting into operation the device 10 for delimiting a crew rest area 12 in an aircraft passenger cabin, it is merely necessary to make the first part 18a of the fastening device 18 ready for operation, where appropriate by pivoting the pivoting lever 32 into its operating position, and to hang the curtain section 14a in the curtain rail 20 of the first part 18a of the fastening device 18. Then, the second part 18b of the fastening device 18 also merely has to be moved into its operating position and the curtain section 14b hung in the curtain rail 20 formed on the holder 42.

The invention claimed is:

1. A device for delimiting a crew rest area in an aircraft passenger cabin, the device comprising:
   a curtain which is adapted to separate at least one seat disposed in the aircraft passenger cabin from a region of the aircraft passenger cabin surrounding the seat, and
   a fastening device for fastening the curtain in the aircraft passenger cabin, the fastening device having at least a first part fixed to or formed integrally with a grip rail intended for installation in the aircraft passenger cabin, the grip rail extending in the direction of a longitudinal axis of the aircraft passenger cabin and defining a recess therein which serves as a holding device for passengers in the aircraft passenger cabin.

2. The device according to claim 1, wherein the first part of the fastening device is adapted to fasten a curtain section which, when installed in the aircraft passenger cabin, separates, in the direction of the longitudinal axis of the aircraft passenger cabin, the at least one seat disposed in the aircraft passenger cabin from a region of the aircraft passenger cabin surrounding the seat.

3. The device according to claim 1, wherein the first part of the fastening device comprises a curtain rail which is fastened to a surface of the grip rail or formed in a surface of the grip rail which, when the grip rail is installed in the aircraft passenger cabin, extends in the direction of the longitudinal axis of the aircraft passenger cabin and faces a floor of the aircraft passenger cabin.

4. The device according to claim 1, wherein the first part of the fastening device comprises a pivoting lever pivotably attached to the grip rail and carrying a curtain rail, the pivoting lever being pivotable between a rest position and an operating position in such a way that the curtain rail provided on the pivoting lever extends in the direction of the longitudinal axis of the aircraft passenger cabin and faces a floor of the aircraft passenger cabin when the pivoting lever is installed in the aircraft passenger cabin and is situated in its operating position.

5. The device according to claim 4, wherein the pivoting lever is pivotably attached to a surface of the grip rail which, when the grip rail is installed in the aircraft passenger cabin, extends in the direction of the longitudinal axis of the aircraft passenger cabin and faces a side wall of the aircraft passenger cabin.

6. The device according to claim 4, wherein the pivoting lever is dimensioned so that, in its rest position, it is capable of bridging a gap which is present in the aircraft passenger cabin between the grip rail and a personal service unit.

7. The device according to claim 1, wherein a second part of the fastening device is adapted to fasten a curtain section which, when installed in the aircraft passenger cabin, separates, in a direction substantially perpendicular to the longitudinal axis of the aircraft passenger cabin, the at least one seat disposed in the aircraft passenger cabin from a region of the aircraft passenger cabin surrounding the seat.

8. The device according to claim 7, wherein the second part of the fastening device comprises a holder pivotably attachable to an interior fitting component of the aircraft passenger cabin and carrying a curtain rail, the holder being pivotable between a rest position and an operating position in such a way that the curtain rail provided on the holder extends in a direction substantially perpendicular to the longitudinal axis of the aircraft passenger cabin and faces a floor of the aircraft passenger cabin when the holder is installed in the aircraft passenger cabin and is situated in its operating position.

9. The device according to claim 8, wherein the holder is pivotable between the rest position and the operating position in such a way that the curtain rail provided on the holder extends in the direction of the longitudinal axis of the aircraft passenger cabin and faces the floor of the aircraft passenger cabin when the holder is installed in the aircraft passenger cabin and is in its rest position.

10. The device according to claim 8, wherein the holder is dimensioned so that, in its rest position, it is capable of being accommodated in a gap which is present in the aircraft passenger cabin between the grip rail and a personal service unit.

11. The device according to claim 8, wherein the holder is pivotably attachable via a telescopic base to the interior fitting component of the aircraft passenger cabin.

12. The device according to claim 3, wherein the curtain rail provided on the first part of the fastening device comprises a groove for receiving at least one connecting device fastened to the curtain.

13. A method for putting into operation a device for delimiting a crew rest area in an aircraft passenger cabin, the method comprising the steps:
providing a curtain which is adapted to separate at least one seat disposed in the aircraft passenger cabin from a region of the aircraft passenger cabin surrounding the seat, and
fastening the curtain in the aircraft passenger cabin to a fastening device having at least a first part fixed to or formed integrally with a grip rail installed extending in the direction of a longitudinal axis of the aircraft passenger cabin and defining a recess therein which serves as a holding device for passengers in the aircraft passenger cabin.

14. The method according to claim 13, wherein by the first part of the fastening device a curtain section is fastened which, when installed in the aircraft passenger cabin, separates, in the direction of the longitudinal axis of the aircraft passenger cabin, the at least one seat disposed in the aircraft passenger cabin from a region of the aircraft passenger cabin surrounding the seat.

15. The method according to claim 14, wherein the fastening of the curtain section in the aircraft passenger cabin by the first part of the fastening device comprises at least one of the following steps:
fastening the curtain section to the first part of the fastening device via a curtain rail which is fastened to a surface of a grip rail or formed in a surface of the grip rail which, when the grip rail is installed in the aircraft passenger cabin, extends in the direction of the longitudinal axis of the aircraft passenger cabin and faces a floor of the aircraft passenger cabin, and
fastening the curtain section to the first part of the fastening device via a curtain rail which is provided on a pivoting lever pivotably attached to the grip rail, the pivoting lever being pivoted, before the fastening of the curtain section, from a rest position, in which it bridges in particular a gap which is present in the aircraft passenger cabin between the grip rail and a personal service unit, into an operating position, in which the curtain rail provided on the pivoting lever extends in the direction of the longitudinal axis of the aircraft passenger cabin and faces the floor of the aircraft passenger cabin.

16. The method according to claim 13, wherein by a second part of the fastening device a curtain section is fastened which, when installed in the aircraft passenger cabin, separates, in a direction substantially perpendicular to the longitudinal axis of the aircraft passenger cabin, the at least one seat disposed in the aircraft passenger cabin from a region of the aircraft passenger cabin surrounding the seat.

17. The method according to claim 16,
wherein the fastening of a curtain section in the aircraft passenger cabin by the second part of the fastening device comprises the following step:
fastening the curtain section to the second part of the fastening device via a curtain rail which is provided on a holder pivotably attached to an interior fitting component of the aircraft passenger cabin, the holder being pivoted, before the fastening of the curtain section, from a rest position, in which the curtain rail provided on the holder extends in the direction of the longitudinal axis of the aircraft passenger cabin and faces a floor of the aircraft passenger cabin and in which the holder is accommodated in particular in a gap which is present in the aircraft passenger cabin between the grip rail and the personal service unit, into an operating position, in which the curtain rail provided on the holder extends in a direction substantially perpendicular to the longitudinal axis of the aircraft passenger cabin and faces the floor of the aircraft passenger cabin.

18. The method according to claim 17, wherein, before the pivoting of the holder from its rest position into its operating position, a telescopic base, via which the holder is pivotably attached to the interior fitting component of the aircraft passenger cabin, is moved into an expanded position.

19. The device according to claim 8, wherein the curtain rail carried by the holder comprises a groove for receiving at least one connecting device fastened to the curtain.

* * * * *